(12) United States Patent
Yamasoe et al.

(10) Patent No.: US 9,010,880 B2
(45) Date of Patent: Apr. 21, 2015

(54) VEHICLE BRAKE SYSTEM

(75) Inventors: Yosuke Yamasoe, Anjyo (JP); Hiroaki Niino, Toyota (JP)

(73) Assignee: Advics Co., Ltd., Kariya, Aichi-Pref (JP)

( * ) Notice: Subject to any disclaimer, the term of this patent is extended or adjusted under 35 U.S.C. 154(b) by 550 days.

(21) Appl. No.: 13/434,453

(22) Filed: Mar. 29, 2012

(65) Prior Publication Data
US 2012/0247100 A1 Oct. 4, 2012

(30) Foreign Application Priority Data

Mar. 31, 2011 (JP) .................................. 2011-080921

(51) Int. Cl.
*B60T 8/44* (2006.01)
*B60T 13/14* (2006.01)
*B60T 8/40* (2006.01)
*B60T 13/68* (2006.01)

(52) U.S. Cl.
CPC ............. *B60T 13/146* (2013.01); *B60T 8/4077* (2013.01); *B60T 13/686* (2013.01)
USPC ..................................................... 303/114.1

(58) Field of Classification Search
USPC ........... 188/151 R, 152, 358–360; 303/114.1; 60/547.1–589
See application file for complete search history.

(56) References Cited

U.S. PATENT DOCUMENTS

| 5,531,509 | A | 7/1996 | Kellner et al. | |
|---|---|---|---|---|
| 7,517,027 | B2 * | 4/2009 | Aoki et al. | 303/114.1 |
| 8,186,772 | B2 * | 5/2012 | Suzuki et al. | 303/114.1 |
| 8,272,700 | B2 * | 9/2012 | Suzuki et al. | 303/114.1 |
| 8,348,351 | B2 * | 1/2013 | Kanagawa et al. | 303/114.1 |
| 8,517,475 | B2 * | 8/2013 | Ishida | 303/114.1 |
| 2005/0200199 | A1 | 9/2005 | Kamiya et al. | |

(Continued)

FOREIGN PATENT DOCUMENTS

CN 1827437 A 9/2006
CN 101365611 A 2/2009

(Continued)

OTHER PUBLICATIONS

Chinese Office Action issued Jan. 22, 2015, by the Chinese Patent Office, in corresponding Chinese Patent Application No. 201210086897.5 with English translation (6 pages).

(Continued)

*Primary Examiner* — Christopher Schwartz
(74) *Attorney, Agent, or Firm* — Buchanan Ingersoll & Rooney PC

(57) ABSTRACT

A vehicle brake system comprises a master brake cylinder having an input piston and master piston and connected to a wheel brake device, a reaction force generating device for generating a reaction force pressure corresponding to a displacement amount of the input piston, a change over valve provided in an open passage branched from a hydraulic conduit connecting the reaction force generating device to the reaction force chamber defined by the input piston and the change over valve connected to a reservoir, a brake force boosting device for applying an assisting pressure to a master piston, an assisting pressure limit judging portion for judging whether the assisting pressure has reached to an assisting limit pressure, and a change over controlling portion for changing over the change over valve to an open state when the assisting pressure limit judging portion judges that the assisting pressure has reached the assisting limit pressure.

10 Claims, 8 Drawing Sheets

(56) References Cited

U.S. PATENT DOCUMENTS

| | | | |
|---|---|---|---|
| 2008/0185241 A1 | 8/2008 | Isono et al. | |
| 2008/0236962 A1 | 10/2008 | Suzuki et al. | |
| 2008/0236971 A1* | 10/2008 | Suzuki et al. | 188/358 |
| 2010/0212314 A1 | 8/2010 | Isono | |

FOREIGN PATENT DOCUMENTS

| | | |
|---|---|---|
| JP | 8-67242 A | 3/1996 |
| JP | 8-253126 A | 10/1996 |
| JP | 2005-289353 A | 10/2005 |
| JP | 2006-007874 A | 1/2006 |
| JP | 2007-62614 A | 3/2007 |
| JP | 2010-000927 A | 1/2010 |

OTHER PUBLICATIONS

Decision to Grant issued Mar. 3, 2015, by the Japan Patent Office, in corresponding Japanese Patent Application No. 2011-080921 (3 pages).

\* cited by examiner

VEHICLE BRAKE SYSTEM

This application claims priority under 35 U.S.C. 119 with respect to Japanese Patent Application No. 2011-080921 filed in Japan on Mar. 31, 2011, the entire content of which is herein incorporated by reference.

BACKGROUND OF THE INVENTION

1. Field of the Invention

The present invention relates to a vehicle brake system which controls braking force applied to a vehicle wheel in response to a brake operation amount operated by an operator of the vehicle.

2. Discussion of the Related Art

As one of such vehicle brake systems for controlling a braking force applied to a vehicle wheel in response to a brake operation amount operated by an operator of the vehicle, a vehicle brake system disclosed in a patent document JP2007-62614A is exampled. According to this vehicle brake system disclosed in the patent document, an input piston and a master piston are separately supported in the master brake cylinder, keeping a predetermined interval (stroke) therebetween and in response to the movement of the input piston, a braking pressure is applied to a wheel brake cylinder based on an assisting pressure generated by an accumulator and a linear valve.

Further, the vehicle brake system according to the patent document indicates that it is assisting pressure limit when the assisting pressure reaches the hydraulic pressure generated by the accumulator and thereafter, the master piston is directly pushed by the input piston to pressurize brake fluid in a hydraulic pressure chamber of the master brake cylinder, thereby applying a braking force pressure to the wheel brake cylinder.

However, according to the invention described in the patent document (JP2007-62614A), after the assisting pressure reaches the assisting limit pressure and the input piston begins to directly push the pressure piston, the operator of the vehicle receives a reaction force corresponding to the hydraulic pressure in the reaction force chamber and further reaction force corresponding to the cylinder pressure from the master piston. Thus, the operator of the vehicle receives an increased reaction force according to this conventional system disclosed in the patent document.

SUMMARY OF THE INVENTION

This invention was made considering the above actual circumstances and this invention pertains to a vehicle brake system capable of efficiently utilizing a brake pedal depression force by an operator of the vehicle as a braking force by decreasing a reaction force to be received by the operator of the vehicle after the system reaches an assisting limit condition.

Accordingly, it is a primary object of the present invention in one aspect to provide an improved vehicle brake system which comprises a master brake cylinder having an input piston inserted into an input cylinder bore and slidable therein in an axial line direction in response to operation of a brake pedal and a master piston inserted into a pressure cylinder bore and arranged with a predetermined distance apart from the input piston in an advancing direction thereof, the master piston being slidable in the pressure cylinder bore in the axial line direction, independently of the slidable movement of the input piston, a reaction force generating device hydraulically connected to a reaction force chamber defined between a bottom portion of the input cylinder bore and a front end surface of the input piston and generating a reaction force pressure in the reaction force chamber corresponding to a displacement amount of the input piston, a change over valve provided in an open passage which is branched from a hydraulic conduit hydraulically connecting the reaction force chamber and the reaction force generating device, the open passage being in hydraulic communication with a reservoir, a brake force boosting device generating an assisting pressure by controlling the brake fluid having an actual accumulator pressure discharged from an accumulator corresponding to the depression force of the brake pedal or an operation amount of the brake pedal and supplying the assisting pressure to an assisting pressure chamber formed in the pressure cylinder bore by defining thereof with a rear side of the master piston, whereby a thrust force which is a boosted depression force of the brake pedal is exerted on the master piston, a wheel brake device having a wheel brake cylinder in hydraulic communication with a hydraulic pressure chamber formed in the pressure cylinder bore defining thereof by a front side of the master piston, the hydraulic pressure chamber generating a basic hydraulic pressure in response to the advancing movement of the master piston, an assisting pressure limit judging portion for judging whether a predetermined condition that the assisting pressure generated by the brake force boosting device has reached to an assisting limit pressure has been established or not, and a change over controlling portion for changing over the change over valve to an open state when the assisting pressure limit judging portion judges that the predetermined condition has been established.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

Figure 7:
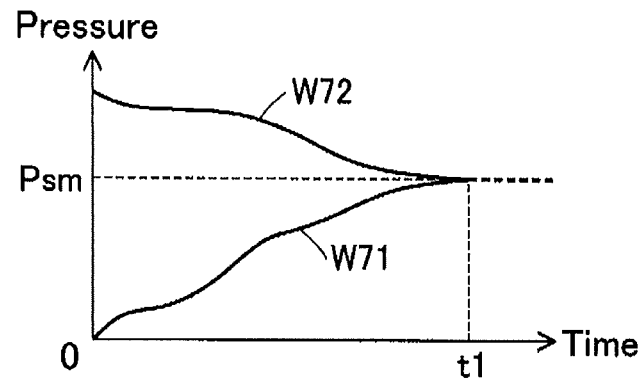
Figure 7:
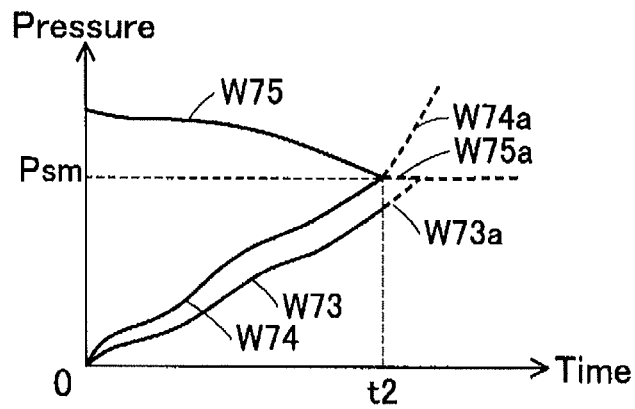
Figure 7:
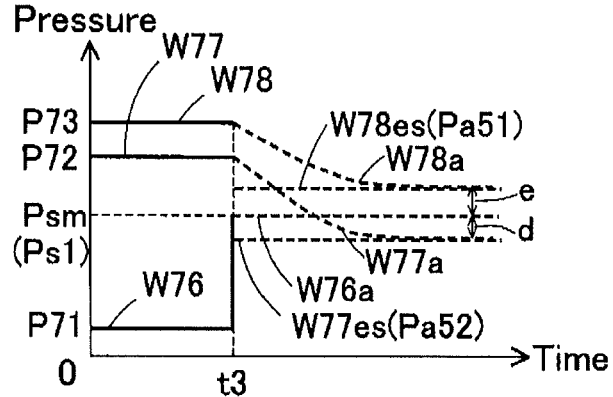
Figure 8:
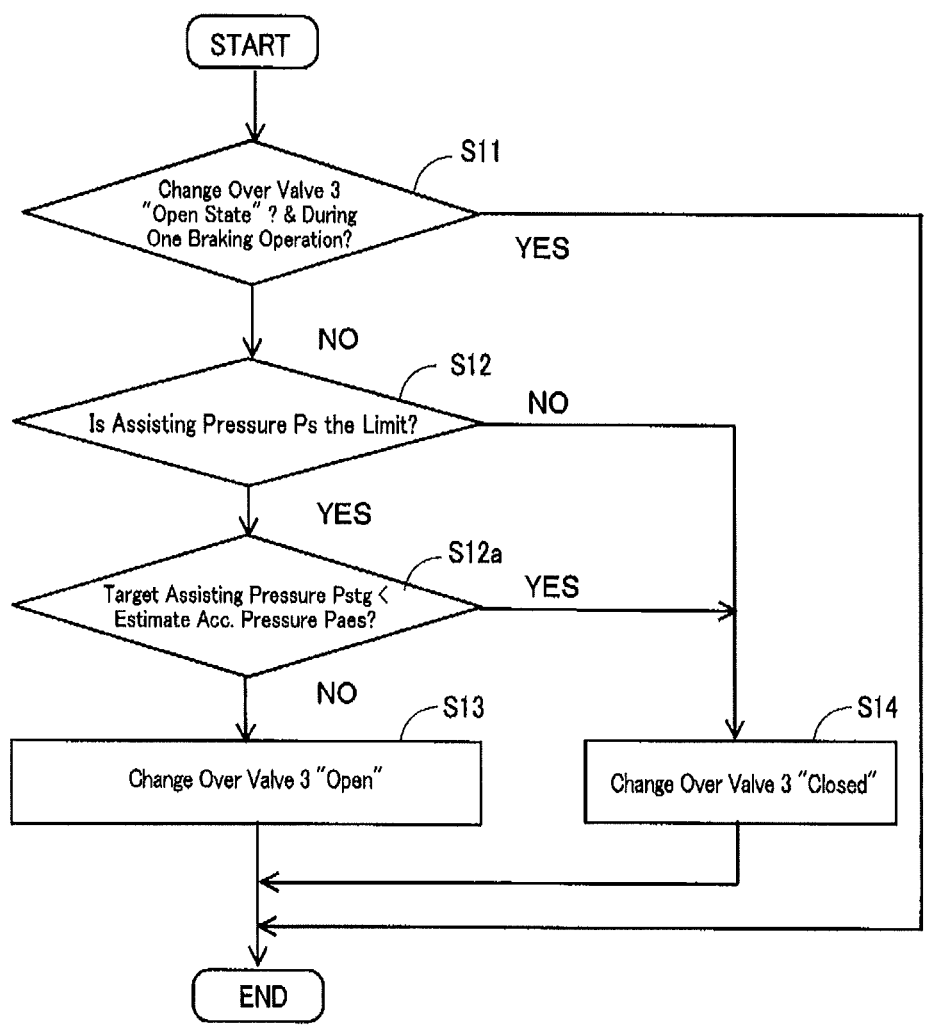
Figure 9:
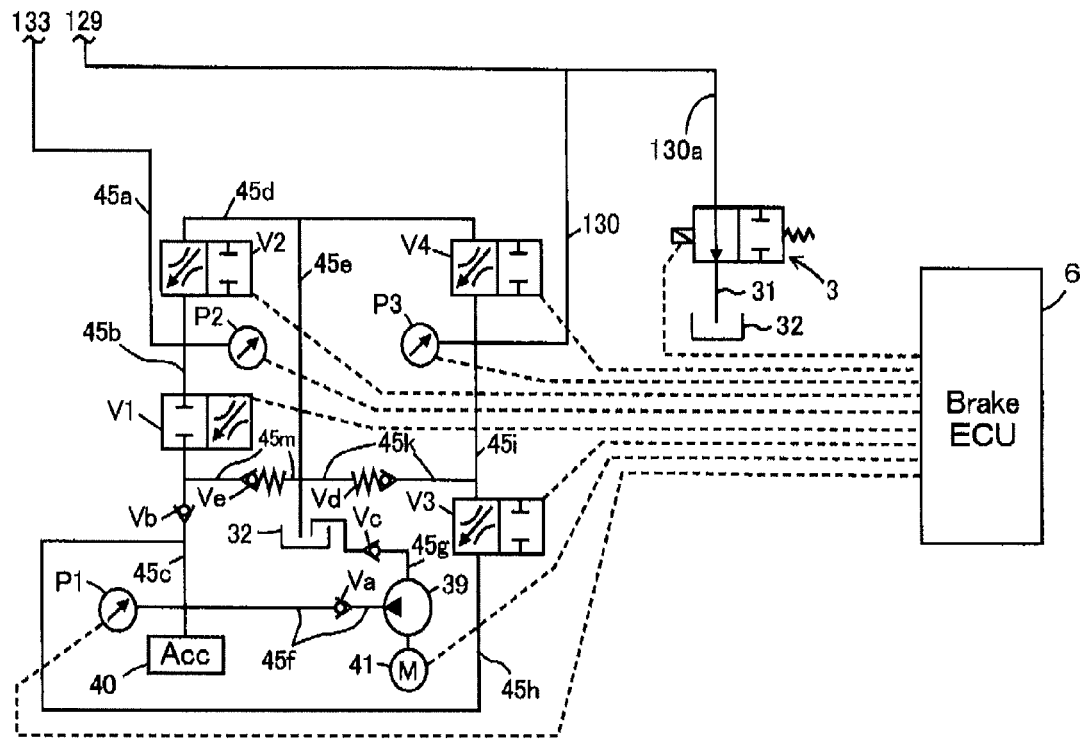

FIG. 7, in general, is a view schematically illustrating change of the assisting pressure with time and the accumulator pressure. The view shown in FIG. 7 (A) relates to the first judging method, the view shown in FIG. 7 (B) relates to the second judging method and the view shown in FIG. 7 (C) relate to the third judging method;

FIG. 8 is an example of a flowchart showing a judging process for judging the assisting pressure limit according to a forth judging method; and FIG. 9 shows an outline structure of a reaction force generating device and a brake force boosting device according to a second embodiment of the invention.

DETAILED DESCRIPTION OF THE PREFERRED EMBODIMENTS

Preferred embodiments of the invention will be explained hereinafter along with the attached drawings. It should be noted that portions or components common to each embodiment will be given the same reference numerals or the legends and duplicated explanation thereof will be omitted in order to avoid or minimize redundancy.

First Embodiment (1-1) Structure of the Vehicle Brake System

Figure 1:
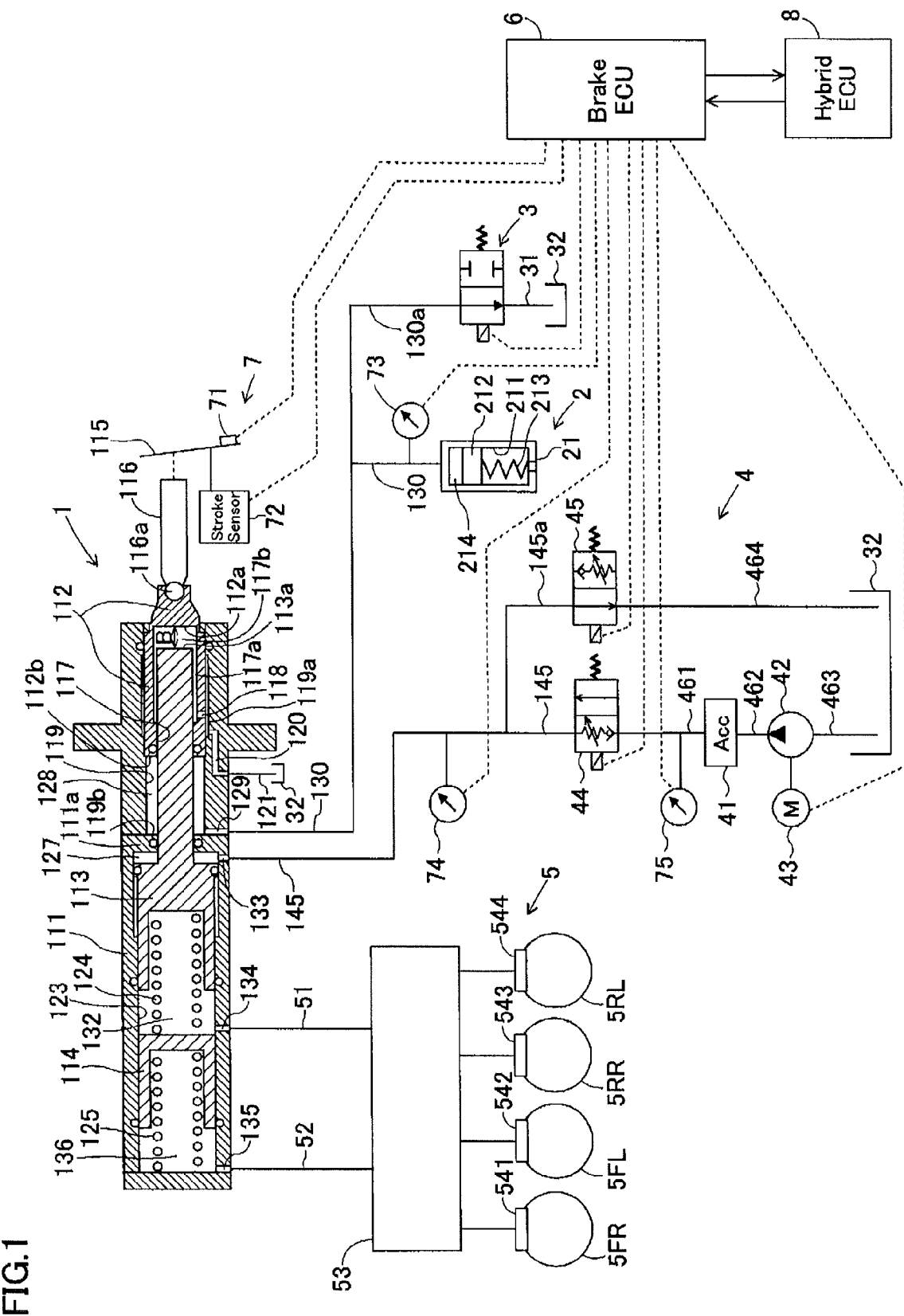
FIG. 1 shows an outline structure of a vehicle brake system according to a first embodiment of the invention.

FIG. 1 shows an outline structure of a vehicle brake system according to a first embodiment of the invention. The vehicle brake system of this embodiment is comprised of a master brake cylinder 1 having first and second master pistons 113 and 114 disposed in the cylinder with a distance B separated from an input piston 112 in an advancing direction thereof. The master pistons 113 and 114 are slidable within the cylinder bore in an axial line direction relative thereto independently of the slidable movement of the input piston 112. The vehicle brake system further includes a reaction force generating device 2 generating a reaction force pressure Pr in a reaction force chamber 128 provided in the master brake cylinder 1 in response to a sliding movement of the input piston 112 and a change over valve 3 disposed in an open fluid passage 31 branched from a fluid passage 130 which hydraulically connects the reaction force chamber 128 and the reaction force generating device 2. The open passage is further connected to a reservoir 32. The brake system further includes a brake force boosting device 4 generating a assisting pressure Ps by controlling a brake fluid having an actual accumulator pressure Par discharged from an accumulator 41 in response to an operation amount of a brake pedal 115 and a wheel brake device 5 having four wheel brake cylinders 541, 542, 543 and 544 provided at vehicle wheels 5FR, 5FL, 5RR and 5RL, respectively. The four wheel brake cylinders are in fluid communication with hydraulic pressure chambers 132 and 136 of the master brake cylinder 1, which generate basic hydraulic pressure Pb. The vehicle brake system further includes a brake ECU 6 which controls the change over operation of the change over valve 3 and the brake force boosting operation of the brake force boosting device 4, various sensors 7 and a hybrid ECU 8 which controls regenerative braking operation. Each of the main components of the vehicle brake system will be explained in more detail one by one.

(1-2) Master Brake Cylinder 1 and Reaction Force Generating Device 2

As shown in FIG. 1, the master brake cylinder 1 is provided with a cylindrically shaped cylinder portion 111 a base end thereof being open and a front end thereof being closed. The input piston 112, the first master piston 113 and the second master piston 114 are inserted into the inside bore of the cylinder portion 111 from the open base end in series and coaxially in this order and each piston is slidable in an axial line direction. A portion of the input piston 112 is projected outwardly from the base end of the cylinder portion 111 and the projected end of the input piston 112 is operatively connected to an operating rod 116 of a brake pedal 115 via a pivot member 116a so that the input piston 112 is movable through the operating rod 116 upon operation (depression) of the brake pedal 115. The moving amount of the brake pedal 115 is also referred to as a "brake operation amount" in this specification of the invention. Further, the first and the second master pistons 113 and 114 are referred to simply as a "master piston".

The input piston 112 is inserted into an input cylinder bore 119 formed at the base end side of the cylinder portion 111 and slidable therein. The input piston 112 is provided with an axial bore 117 at an inserted portion of the input piston 112. The axial bore 117 is open at a front end side and closed at a base end side forming a closed end surface 112a which corresponds to an inner wall of the closed end of the input piston 112. A columnar rod portion of the first master piston 113 is inserted into the axial bore 117 from the first master piston 113 side, penetrating a partition wall 111a of the cylinder portion 111 and extending towards the closed base end surface side and slidable therein. An end surface 113a of the inserted columnar rod portion is arranged to be in parallel with the closed end surface 112a of the input piston 112. A gap or a predetermined distance B is provided between the end surface 113a and the closed end surface 112a. This distance B is secured during the brake pedal 115 being under non-operation condition.

The reaction force chamber 128 is formed between an end surface 112b at the front end side of the input piston 112 and the partition wall 111a which corresponds to a bottom portion 119b of the input cylinder bore 119. A port 129 is formed in the vicinity of the partition wall 111a of the reaction force chamber 128 and is extending outwards, penetrating through the peripheral wall of the cylinder portion 111. This port 129 is hydraulically connected to a stroke simulator 21 which forms the main part of the reaction force generating device 2 through a conduit (passage) 130.

The stroke simulator 21 includes a piston 212 slidably inserted into a cylinder 211 and biased frontward by a compression spring 213 and a pilot hydraulic pressure chamber 214 defined by a front face of the piston 212 and the cylinder 211. The pilot hydraulic pressure chamber 214 is in fluid communication with the reaction force chamber 128 via the conduit 130. When the brake pedal 115 is depressed by the operator of the vehicle, the input piston 112 moves forward, and then, the brake fluid in the reaction force chamber 128 is pumped out to the pilot hydraulic pressure chamber 214. Then, the piston 212 in the stroke simulator 21 retreats, overcoming a spring force in proportion to an amount of deflection of the compression spring 213. According to this series of operation, the hydraulic pressure in the reaction force chamber 128 increases in response to the brake operation amount which corresponds to the moving amount of the brake pedal 115 and a reaction force corresponding to the brake operation amount is applied to the brake pedal 115. A pressure sensor 73 is provided in the conduit 130 for detecting the pressure Pr in the reaction force chamber 128. In this specification, the pressure Pr in the reaction force chamber 128 is referred to as "reaction force pressure".

The axial bore 117 of the input piston 112 is formed with a large diameter portion with a predetermined length in an axial line direction so that a passage 117a with a predetermined gap in the axial line direction between the inner peripheral surface of the axial bore 117 of the input piston 112 and an outer peripheral surface of the rod portion of the first master piston 113 may be formed. A through-hole 118 is provided at the peripheral wall of the input piston 112. The through-hole 118 is formed to penetrate the peripheral wall of the piston 112 to be in fluid communication with the passage 117a. Further, the input cylinder bore 119 is formed with a large diameter portion with a predetermined length in an axial line direction so that a passage 119a with a predetermined gap in the axial line direction between the outer peripheral surface of the input piston 112 and an inner peripheral surface of the input cylinder bore 119 may be formed. A passage 120 is provided to be penetrating through the peripheral wall of the cylinder portion 111 and is in fluid communication with the passage 119a in the vicinity of the tip end portion. The passage 120 is connected to a reservoir 32 for reserving therein the brake fluid via a conduit 121. Accordingly, a gap portion 117b between the end surface 113a of first master piston 113 and the closed end surface 112a of the input piston 112 is hydraulically connected to the reservoir 32 via the passage 117a, throughhole 118, passage 119a, passage 120 and the conduit 121. This communication state is kept regardless the amount of brake operation and the gap portion 117b is always exposed to the atmosphere.

A pressure cylinder bore 123 is formed in the cylinder portion 111 and is divided by the partition wall 111a from the input cylinder bore 119. The first master piston 113, having a U-shape in cross section, is inserted into the pressure cylinder bore 123 and is slidable therein. The second master piston 114, having a U-shape in cross section, is arranged at the tip end side of the first master piston 113 and is slidably inserted into the pressure cylinder bore 123.

An assisting pressure chamber 127 is formed between the partition wall 111a and the first master piston 113. A first hydraulic pressure chamber 132 is formed between the first master piston 113 and the second master piston 114 and a second hydraulic pressure chamber 136 is formed between the second master piston 114 and a closed tip end surface of the pressure cylinder bore 123. A first compression spring 124 is disposed between the bottom of U-shape of the first master piston 113 and the rear end surface of the second master piston 114 and a second compression spring 125 is disposed between the bottom of U-shape of the second master piston 114 and the closed tip end surface of the pressure cylinder bore 123. Thus, the first and the second master pistons 113 and 114 are biased towards base end side of the cylinder portion 111 by the spring force of the first and the second compression springs 124 and 125 and are kept to the respective inoperative positions when the brake pedal 115 is not operated. The first hydraulic pressure chamber 132 and the second hydraulic pressure chamber 136 may be commonly referred to as "hydraulic pressure chamber" in this specification.

Under the brake pedal 115 being in inoperative position, the end surface 113a of the rod portion of the first master piston 113 is held to keep the predetermined distance B from the closed end surface 112a of the input piston 112. When the operator of the vehicle operates the brake pedal 115 for braking operation, the input piston 112 relatively moves forward by the distance B relative to the first master piston 113. Then the input piston 112 become in contact with the end surface 113a of the first master piston 113. Under this state, the input piston 112 is operable to push the first master piston 113.

A port 133 is provided at the cylinder portion 111 in the vicinity of the partition wall 111a of the assisting pressure chamber 127. The port 133 is formed to penetrate through the peripheral wall of the cylinder portion 111 and extending outwardly. Another port 134 is provided at the first hydraulic pressure chamber 132 which is formed in the pressure chamber 123 between the first and the second master pistons 113 and 114 and is positioned in the vicinity of rear end surface of the second master piston 114 which is positioned at a predetermined inoperative position. The port 134 is formed to penetrate through the peripheral wall of the cylinder portion 111 and extending outwardly. Further port 135 is provided at the second hydraulic pressure chamber 136 which is formed between the tip end side of the second master piston 114 and the closed tip end side surface of the cylinder portion 111 in the vicinity of the tip end surface of the cylinder portion 111. The port 135 is formed to penetrate through the peripheral wall of the cylinder portion 111 and extend outwardly.

The first and the second master pistons 113 and 114 are moved forward in an axial line direction to pressurize the brake fluid in the first and the second hydraulic pressure chambers 132 and 136, respectively, by the assisting pressure Ps generated in the assisting pressure chamber 127 caused by the operation of the braking force boosting device 4. The pressurized brake fluid in the first and the second hydraulic pressure chambers 132 and 136 is then supplied to the wheel brake cylinders 541 through 544 from the ports 134 and 135 via conduits 51 and 52 and an ABS (Anti-Lock Brake System) 53 as the basic hydraulic pressure Pb. This pressure Pb is applied to each wheel cylinder 541, 542, 543 and 544 of the vehicle to apply the basic braking force Fb to each wheel 5FR, 5FL, 5RR and 5RL.

It is noted here that sealing members such as O-rings are provided between the inner peripheral surface of the input cylinder bore 119 and the outer peripheral surface of the input piston 112, between the pressure cylinder bore 123 and the outer peripheral surfaces of the first and the second master pistons 113 and 114, and between the inner peripheral surface of the axial bore 117 of the input piston 112 and the partition wall 111a and the outer peripheral surface of the rod portion of the first master piston 113 to prevent brake fluid leakage therebetween. These sealing members are indicated in FIG. 1 marked as O (meaning O-ring member).

(1-3) Change Over Valve 3

The change over valve 3 is disposed in a hydraulic passage between a branch conduit 130a branched from the conduit 130 which connects the reaction force chamber 128 with the reaction force generating device 2 and the open passage 31 in communication with the reservoir 32. An electromagnetic valve may be used as the change over valve 3. The change over valve 3 is switched over between the open state and the closed state in response to the control signal from the brake ECU 6. When the change over valve is under open state, the branch conduit 130a and the open passage 31 are hydraulically connected to establish fluid communication between the port 129 of the reaction force chamber 128 and the reservoir 32. When the change over valve is under a closed state, the reaction force pressure Pr generated by the stroke simulator 21 is supplied to the reaction force chamber 128.

(1-4) Brake Force Boosting Device 4

The boosting device 4 generates assisting pressure Ps by controlling the brake fluid having actual accumulator pressure Par accumulated in the accumulator 41 and exerts a thrust force to the first and the second master pistons 113 and 114 of the master brake cylinder 1 by supplying the assisting pressure Ps to the assisting pressure chamber 127 of the master brake cylinder 1 thereby boosting a depression force F of the brake pedal 115.

A linear valve 44 for pressure increase, a linear valve 45 for pressure decrease, a hydraulic pressure pump 42 and an accumulator (Acc) 41 are disposed in the conduit between the port 133 of the assisting pressure chamber 127 and the reservoir 32 and are hydraulically connected to one another via the conduits 145, 145a, 461, 462, 463 and 464, respectively. In more detail, the port 133 is connected to the conduit 145 at one end thereof. The other end of the conduit 145 is hydraulically connected to an outlet side port of the linear valve 44 for pressure increase. An inlet side port of the linear valve 44 for pressure increase is connected to an outlet side port of the accumulator 41 via the conduit 461. An inlet side port of the accumulator (Acc) 41 is connected to a discharge side port of the hydraulic pressure pump 42 via the conduit 462. A suction side port of the hydraulic pressure pump 42 is connected to the reservoir 32 via the conduit 463. A pump driving motor 43 is connected to the hydraulic pressure pump 42. The conduit 145 which connects the port 133 and the linear valve 44 for pressure increase is branched to be a branched conduit 145a which is hydraulically connected to the inlet side port of the linear valve 45 for pressure decrease. The outlet side port of the linear valve 45 for pressure decrease is connected to the reservoir 32 via the conduit 464.

A pressure sensor 74 is disposed in the conduit 145 for detecting the hydraulic pressure in the assisting pressure chamber 127 which corresponds to the actual assisting pressure Psr. Another pressure sensor 75 is disposed in the conduit 461 which is connected to the discharge port of the accumulator 41 for detecting the pressure energy (actual accumulator pressure Par) accumulated in the accumulator 41.

The accumulator 41 accumulates therein the hydraulic pressure generated by the hydraulic pressure pump 42 and the braking force can be generated by supplying this accumulated hydraulic pressure to the assisting pressure chamber 127 via the linear valve 44 for pressure increase. When the pressure sensor 75 detects that the level of actual accumulator pressure Par has dropped below a predetermined value, the motor 43 for driving the pump is driven upon receipt of a control signal from the brake ECU 6 and the hydraulic pressure pump 42 is driven to supply the accumulator 41 with brake fluid for supplementing pressure energy to the accumulator 41. The accumulator 41 is placed in an downstream side of the hydraulic pressure pump 42 for dampening the pulsation of brake fluid ejected from the pump 42.

An electromagnetic valve of fluid flow modulating type is used for the linear valve 44 for pressure increase and the linear valve 45 for pressure decrease. When the assisting pressure Ps in the assisting pressure chamber 127 is to be raised, a throttle resistance of the linear valve 44 is decreased and the throttle resistance of the linear valve 45 is increased. Vice versa, when the assisting pressure Ps in the assisting pressure chamber 127 is to be dropped, a throttle resistance of the linear valve 45 is decreased and the throttle resistance of the linear valve 44 is increased. When the linear valve 45 for pressure decrease is closed and the throttle resistance value of the linear valve 44 for pressure increase is minimized, the assisting limit pressure Psm is generated in the assisting pressure chamber 127. On the other hand, when the linear valve 44 for pressure increase is closed and the throttle resistance value of the linear valve 45 for pressure decrease is minimized, the assisting pressure Ps cannot be generated in the assisting pressure chamber 127. The assisting pressure Ps can be thus generated by modulating the throttle resistance values of the linear valve 44 for pressure increase and the linear valve 45 for pressure decrease in response to the brake operation amount S. By supplying the assisting pressure chamber 127 with the assisting pressure Ps, a thrust force which is a boosted pedal depression force F of the operator of the vehicle can be exerted on the first and the second master pistons 113 and 114 of the master brake cylinder 1.

(1-5) Wheel Brake Device 5

The first and the second hydraulic pressure chambers 132 and 136 which generate basic hydraulic pressure Pb, are connected to the wheel brake cylinders 541, 542, 543 and 544 via the conduits 51 and 52 and the ABS 53. The wheel brake cylinders 541 through 544 form each wheel brake device 5 of each vehicle wheel 5FR (Front Right Wheel), 5FL (Front Left Wheel), 5RR (Rear Right Wheel) and 5RL (Rear Left Wheel).

In more detail, the port 134 of the first hydraulic pressure chamber 132 and the port 135 of the second hydraulic pressure chamber 136 are respectively connected to a well known ABS (Anti-Lock Brake System) 53 via the conduits 51 and 52, respectively. The ABS 53 is hydraulically connected to the wheel brake cylinders 541 through 544 which are to be actuated to apply brake force to the vehicle wheels 5Fr through 5RL.

The pressurized brake fluid supplied from the accumulator 41 is controlled by the pressure increase and decrease linear valves 44 and 45 to generate the assisting pressure Ps in the assisting pressure chamber 127. The brake fluid in the first and the second hydraulic pressure chambers 132 and 136 are then pressurized by the advancing movement of the first and the second master pistons 113 and 114 by the generated assisting pressure Ps. The pressurized brake fluid in the first and the second hydraulic pressure chambers 132 and 136 is then transmitted and supplied as the basic hydraulic pressure Pb from the ports 134 and 135 to the wheel brake cylinders 541 through 544 of the wheel brake device 5 via the conduits 51 and 52 and the ABS 53 thereby applying hydraulic braking force Fb to the vehicle wheels 5FR through 5RL.

(1-6) Brake ECU 6 and Hybrid ECU 8

The brake ECU (Electronic Control Unit) 6 is electrically connected to the motor 43 for pump driving, the linear valve 44 for pressure increase, the linear valve 45 for pressure decrease of the boosting device 4 and linear solenoid of the change over valve 3. The brake ECU 6 is an electronic control unit that controls these electrically connected components/devices. Further, the brake ECU 6 is also electrically connected to a depression force detecting sensor 71 and a stroke detecting sensor 72 provided at the brake pedal 115, the pressure sensor 73 for detecting the reaction force pressure Pr, the pressure sensor 74 for detecting the actual assisting pressure Psr, the pressure sensor 75 for detecting the actual accumulator pressure Par and the hybrid ECU 8. For example, a pedal stroke value (detected value) of the brake pedal 115 is inputted to the brake ECU 6 from the stroke detecting sensor 72. Accordingly, the brake ECU 6 can calculate the brake depression amount (brake operation amount) S based on the detected pedal stroke value. The brake ECU 6 can also calculate the depression amount (brake operation amount) S from the depression force F detected by the depression force detecting sensor 71 or from the reaction force pressure value (Pr) detected by the pressure sensor 73. Further, the brake ECU 6 can calculate the brake depression amount (brake operation amount) S based on any combination of such detected values.

The brake ECU 6 obtains a target braking force Ft which corresponds to the brake operation amount S detected by the stroke detecting sensor 72 using a map, table or a computing equation. The brake ECU then divides the target braking force Ft into two components, a target regeneration braking force Frt and a target hydraulic pressure braking force Fbt. In order to generate the assisting pressure Ps corresponding to the target hydraulic pressure braking force Fbt, the brake ECU outputs a control signal which controls the throttle resistance of the pressure increase linear valve 44 and pressure decrease linear valve 45. In other words, the brake ECU 6 outputs an electric current value which energizes linear solenoids of the pressure increase linear valve 44 and pressure decrease linear valve 45. The boosting device 4 upon receiving the control signal from the brake ECU 6, generates the assisting pressure Ps corresponding to the target hydraulic pressure braking force Fbt at the assisting pressure chamber 127. Thus generated assisting pressure Ps is supplied to the wheel brake cylinders 541 through 544 as the basic hydraulic pressure Pb to apply hydraulic braking force Fb to the vehicle wheels 5FR through 5RL.

Further, the hybrid ECU 8 applies regeneration braking force Fr to the driving wheels in response to the target regeneration braking force Frt. In more detail, the hybrid ECU 8 operates an electric motor (not shown) as generator generating electricity by using the rotation of the driving vehicle wheels in response to the target regeneration braking force Frt, thereby applying regeneration braking force to the driving wheels to decelerate the vehicle speed and at the same time convert the kinetic (rotation) energy into electric energy. Thus converted electric energy is collected to a battery through an inverter (both are not shown). Thus, the regeneration cooperative control can be achieved, which cooperatively applies hydraulic pressure braking force Fb and the regeneration braking force Fr to the vehicle wheels 5FR through 5RL.

Figure 2:
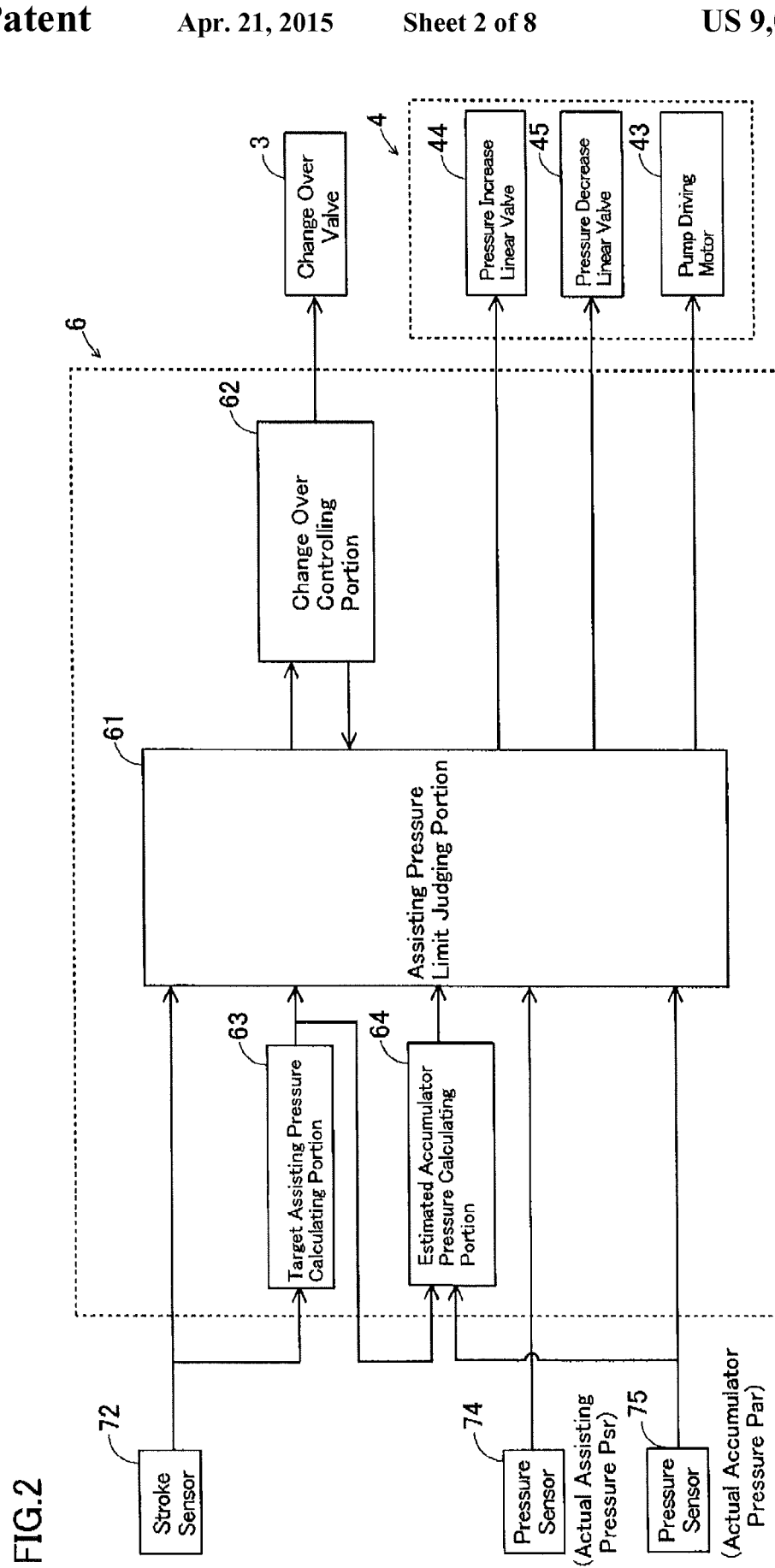
FIG. 2 is a view illustrating a controlling block diagram of a brake ECU shown in FIG. 1.

FIG. 2 indicates the block diagram of control block for brake ECU 6 shown in FIG. 1. The brake ECU 6 of this control block includes an assisting pressure limit judging portion 61, a change over controlling portion 62, a target assisting pressure calculating portion 63 and an estimated accumulator pressure calculating portion 64. The detected value of the stroke detecting sensor 72 is inputted to the assisting pressure limit judging portion 61 and the detected values from the pressure sensor 74 for detecting the actual assisting pressure Psr and the pressure sensor 75 for detecting the actual accumulator pressure Par, and the calculation results from the target assisting pressure calculating portion 63 and the estimated accumulator pressure calculating portion 64 are inputted to the assisting pressure limit judging portion 61, when necessary.

The assisting pressure limit judging portion 61 controls the pump driving motor 43, the linear valve 44 for pressure increase and the linear valve 45 for pressure decrease and at the same time judges whether the predetermined condition that the assisting pressure Ps reaches the assisting limit pressure is satisfied or not. The judging result is outputted to the change over controlling portion 62. The change over controlling portion 62 changes the valve 3 over to the open state when the predetermined condition was judged to be satisfied by the assisting pressure limit judging portion 61. Further, the change over controlling portion 62 outputs the state of the change over valve 3 (open or closed state) to the assisting pressure limit judging portion 61. The operation will be explained in more detail with reference to FIG. 3.

Figure 3:
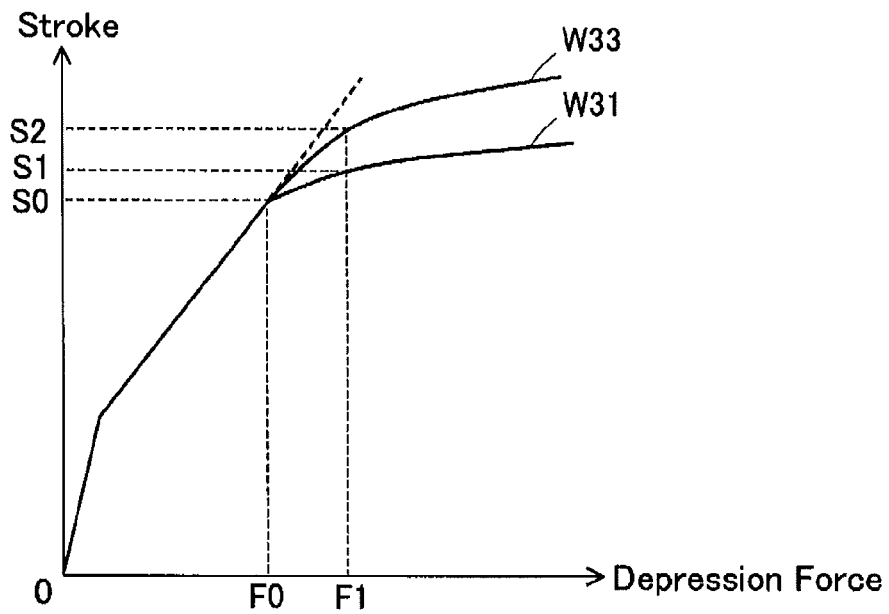
FIG. 3 (A) is a graph showing a relationship between brake pedal depression force and brake pedal stroke and FIG. 3 (B) shows a graph similar to FIG. 3 (A), but showing a relationship between the brake pedal depression force and wheel cylinder pressure (basic hydraulic pressure)
Figure 3:
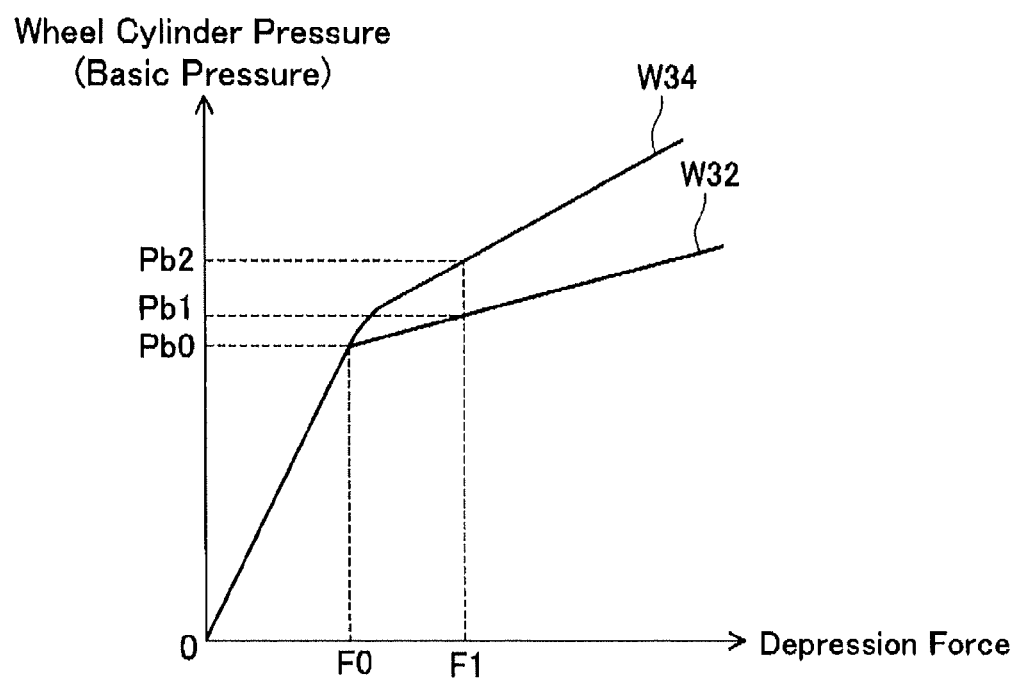

FIG. 3 (A) shows the relationship between the brake pedal depression force and the pedal stroke. FIG. 3 (B) shows the relationship between the brake pedal depression force and the wheel brake cylinder pressure (basic hydraulic pressure). When the operator of the vehicle depresses the brake pedal and the depression force F increases accordingly, the pedal stroke S which represents the brake operation amount and the wheel brake cylinder pressure (basic hydraulic pressure) Pb increase. The reaction force pressure Pr in the reaction force pressure chamber 128 increases according to the increase of the depression force F until the value F reaches to the value F0 to exert a reaction force generated by the stroke simulator 21 to the brake pedal 115. In response to the control signal from the assisting pressure limit judging portion 61 (brake ECU 6), the brake force boosting device 4 generates the assisting pressure Ps and supplies the assisting pressure chamber 127 of the master brake cylinder 1 with the generated assisting pressure Ps. This assisting pressure Ps is supplied to the wheel brake cylinders 541 through 544 as the basic hydraulic pressure Pb.

When the depression force F is raised to the value F0, the assisting pressure Ps reaches the maximum pressure that can be supplied by the accumulator 41. This maximum pressure is the assisting limit pressure. At the assisting pressure limit, the values of the stroke S and wheel brake cylinder pressure (basic hydraulic pressure) Pb are the values S0 and Pb0, respectively. When the assisting pressure Ps reaches the assisting limit pressure, the basic hydraulic pressure Pb cannot be increased any further by the accumulated pressure by the pressure accumulation of the accumulator 41. Accordingly, when the depression force F exceeds the value F0, the input piston 112 directly pushes the first master piston 113 to pressurize the brake fluid in the first and the second hydraulic pressure chambers 132 and 136 of the master brake cylinder 1 thereby applying the basic hydraulic pressure Pb corresponding to the target hydraulic braking force Fbt to the wheel brake cylinders 541 through 544. The relationship among the values of basic hydraulic pressure Pb, assisting pressure Ps and reaction force pressure Pr can be represented as the following Equation 1, wherein Sr represents cross sectional area of the reaction force chamber 128 in a radical direction, Ss represents cross sectional area of the assisting pressure chamber 127 in a radical direction and Sb represents cross sectional area of the first and the second hydraulic pressure chambers 132 and 136 in a radical direction.

$$Pb*Sb=Ps*Ss-Pr*Sr+F \quad \text{(Equation 1)}$$

In a conventional braking system, when the assisting pressure Ps reaches the assisting limit pressure and thus the input piston 112 directly pushes the first master piston 113, the operator of the vehicle receives a reaction force "Pr*Sr" based on the reaction force pressure Pr and another reaction force "Pb*Sb" based on the basic hydraulic pressure Pb from the master piston 113. This will increase the reaction force which the operator of the vehicle receives (through the brake pedal). This braking performance is shown with the curved lines W31 and W32 in FIG. 3. At the depression force value F1 where the assisting pressure Ps has reached the assisting limit pressure, the values of stroke S and wheel brake cylinder pressure (basic hydraulic pressure) Pb are the values S1 and Pb1, respectively. The increase of values of stroke S and wheel brake cylinder pressure (basic hydraulic pressure) Pb is gradual, even the depression force F further increases.

According to this embodiment of the invention, when the condition that the assisting pressure Ps achieves the assisting limit pressure is judged to be satisfied by the assisting pressure limit judging portion 61, the change over controlling portion 62 change over the valve 3 to the open state. When the change over valve 3 is changed over to the open state, the brake fluid is discharged from the port 129 of the reaction force chamber 128 to the reservoir 32. Thus the reaction force pressure Pr becomes zero and accordingly, the reaction force "Pr*Sr" based on the reaction force Pr in the Equation 1 above becomes zero, and thereby the operator of the vehicle receives less reaction force. After the assisting pressure Ps exceeds beyond the assisting limit pressure, increase in the wheel brake cylinder pressure (basic hydraulic pressure) Pb becomes closely corresponding to the brake operation amount by the operator with respect to the increase in stroke S. Accordingly, after the assisting pressure Ps has exceeded the assisting limit pressure value, the depression force F of the operator can be used efficiently for the hydraulic braking force Fb. In FIG. 3, this braking performance is shown in the curved lines W33 and W34. When the depression force indicates the value F1, the values of stroke S and wheel brake cylinder pressure (basic hydraulic pressure) Pb are indicated as the values of S2 and Pb2, respectively. These values are larger than the values (S1 and Pb1) under the change over valve 3 being kept closed.

Figure 4:
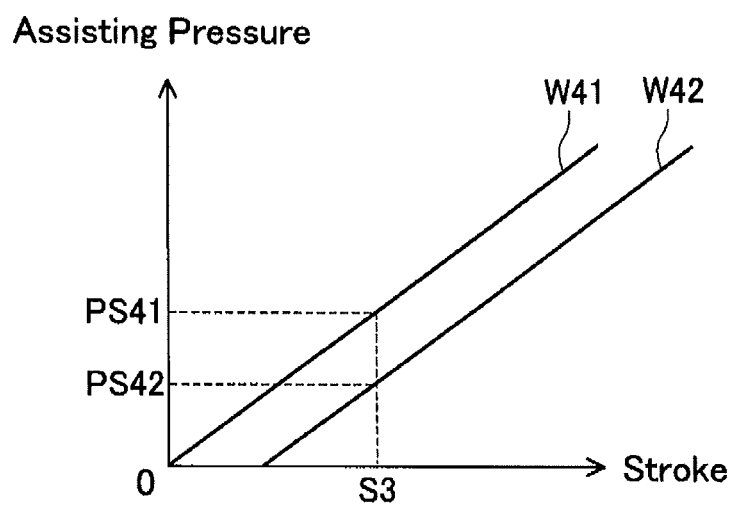
FIG. 4 is a graph showing a relationship between assisting pressure and brake pedal stroke.

The target assisting pressure calculating portion 63 calculates the target assisting pressure Pstg which is to be generated by the boosting device 4 in response to the brake pedal 115 operation amount S. The target assisting pressure calculating portion 63 obtains the target assisting pressure Pstg by utilizing map, table or the calculation formula in response to the brake pedal 115 operation amount S which is detected by the stroke detecting sensor 72. The map, table or the formula which indicates the relationship between the stroke (the braking operation amount S of the brake pedal) and the target assisting pressure Pstg is prepared in advance by an experiment or the like and has been memorized in a program stored in the memory of the brake ECU 6. FIG. 4 indicates the relationship between the stroke and the assisting pressure and the straight line W41 in FIG. 4 indicates the braking operation where no regeneration braking performance is made and the straight line W42 indicates the braking operation where the regeneration braking is performed. For example, if a regeneration braking cannot be used due to a situation of battery charging, the assisting pressure value PS41 is outputted as the target assisting pressure Pstg at the brake operation amount S being indicated as S3. However, when the regeneration braking operation is performed, the target assisting pressure Pstg is outputted as the value of PS42 at the brake operation amount S being indicated as S3.

According to the target assisting pressure calculating portion 63, the target assisting pressure Pstg can be also obtained from the detected values of the depression detecting sensor 71 or the pressure sensor 73 which detects the reaction force pressure Pr. According to the target assisting pressure calculating portion 63, can calculate the target assisting pressure Pstg with any combination of these values from the sensors. The combination of the detected values of depression force F and or the reaction force pressure Pr corresponds to the value of the braking operation amount S (stroke S).

The estimated accumulator pressure calculating portion 64 calculates the estimated accumulator pressure Paes which corresponds to an estimated value of pressure accumulated in the accumulator 41. The estimated accumulator pressure calculating portion 64 calculates the estimated accumulator pressure Paes based on the actual accumulator pressure Par and the target assisting pressure Pstg by utilizing map, table or calculation formula. The map, table or the calculation formula can be obtained in advance by an experiment or the like and memorized in a program stored in the memory of the brake ECU 8.

Figure 5:
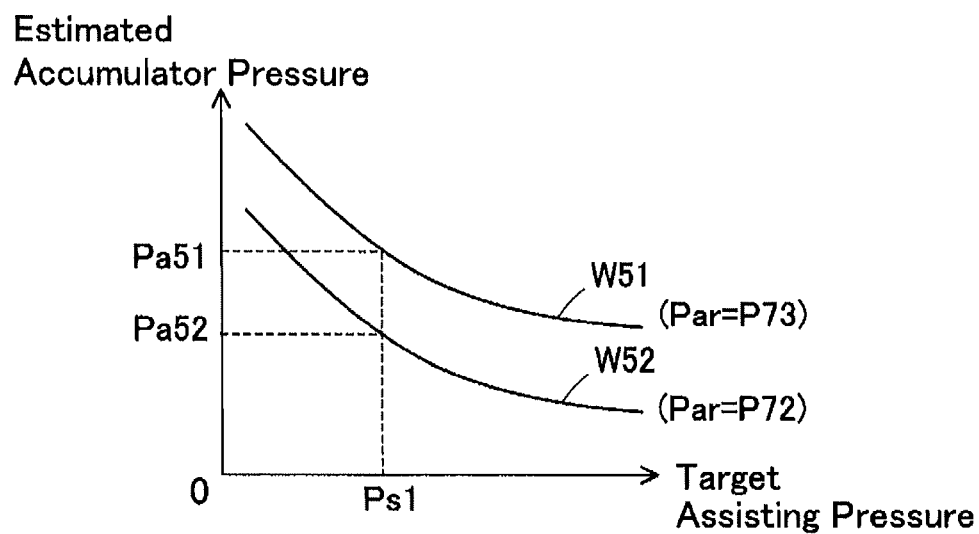
FIG. 5 is a graph showing a relationship between accumulator pressure and assisting pressure.

FIG. 5 indicates the relationship between the target assisting pressure and the estimated accumulator pressure. The curved line W51 indicates the case where the actual accumulator pressure Par is the value of P73 at the beginning of the brake operation, whereas the curved line W52 indicates the case where the actual accumulator pressure Par is the value of P72. When the actual accumulator pressure Par is P73, and the target assisting pressure Pstg is Ps1, the pressure value of Pa51 is outputted as the estimated accumulator pressure Paes. When the actual accumulator pressure Par is P72, and the target assisting pressure Pstg is Ps1, the pressure value of Pa52 is outputted as the estimated accumulator pressure Paes.

(1-7) Method for Judging Assisting Pressure Limit

Figure 6:
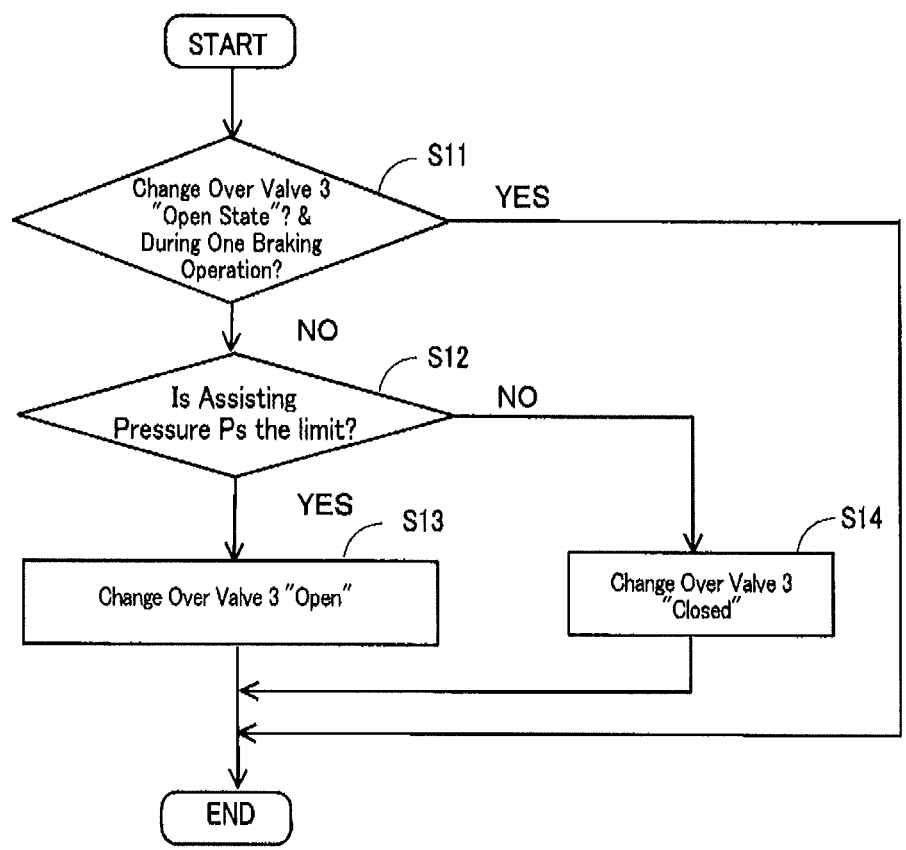
FIG. 6 is an example of a flowchart showing judging process for judging assisting pressure limit according to the first through third judging methods.

The brake ECU 6 judges whether the predetermined condition that the assisting pressure Ps has reached the assisting limit pressure is satisfied or not by executing the program stored in the memory. FIG. 6 shows an example of the procedure of judging whether the assisting pressure has reached the assisting limit pressure, associated with the first through third judging methods. FIG. 7 shows a schematic diagram indicating the change with time of the assisting pressure and the accumulator pressure, wherein FIG. 7 (A) indicates the first judging method, FIG. 7 (B) indicates the second judging method and FIG. 7 (C) indicates the third judging method.

The program in the memory is repeatedly executed per predetermined time elapsed in accordance with the flowchart shown in FIG. 6. Judgments in step S11 and step S12 are made at the assisting pressure limit judging portion 61 and the processes in step S13 and step S14 are executed at the change over controlling portion 62. The change over valve 3 is in the closed state at the initial value or the program.

First, the assisting pressure limit judging portion 61 judges whether the change over valve 3 is in an open state and the system is "during one braking operation" (Step S11). Whether the system is "during the one braking operation" or not is judged whether the brake operation amount S detected by the stroke detecting sensor 72 keeps a predetermined value or more than that over time or not. In more detail, when the brake pedal 115 is depressed by the operator of the vehicle and the brake operation amount S reaches to a predetermined amount value, the assisting pressure limit judging portion 61 memorizes "the braking operation start". Every time the program is repeated, the judgment of the process in the step S11 is made. When the operator of the vehicle loosens or stops brake pedal depression and the braking operation amount S becomes less than the predetermined value, the assisting pressure limit judging portion 61 memorizes "the braking operation end". This period from the braking operation start to the braking operation end is defined to be "during one braking operation".

When the change over valve 3 is in the open state and at the same time "during the one braking operation", the assisting pressure limit judging portion 61 keeps the change over valve 3 to be in the open state without executing later explained judgment and processes in the steps S12 through S14. During the one braking operation period, if the change over valve 3 repeats the change over operation from open to closed or closed to open state, the reaction force pressure Pr suddenly changes. Accordingly, if the change over valve 3 is in open state, by keeping the valve to the same state (open state) during the one braking operation, such sudden changes of the reaction force pressure Pr can be prevented. This can eventually improve the braking operation maneuverability by preventing the sudden changes of the reaction force pressure Pr, which may lead to give an uncomfortable brake operation to the operator.

When the condition in the step S11 is not satisfied, the assisting pressure limit judging portion 61 judges whether the assisting pressure Ps exceeds the assisting limit pressure value or not (step S12). Judgment whether the assisting pressure Ps exceeds the limit value or not is made based on either one of the following first through third methods which will be explained later in detail. If the assisting pressure Ps is judged to be the assisting limit pressure at the step S12, the change over controlling portion 62 changes the change over valve 3 over to the open state. (step S13). If the assisting pressure Ps is judged not to be the assisting limit pressure, the change over controlling portion 62 changes the change over valve 3 over to the closed state, if the valve is in open state. (step S14). After execution of process S13 or S14, the brake ECU tentatively ends this routine. The change over valve 3 is changed over to the closed state due to the completion of the one braking operation as follows: With the movement of the input piston 112 towards the base end side of the cylinder portion 111, the brake fluid is supplied from the reservoir 32 towards the port 129 of the reaction force chamber 128. Therefore, after this supply of the brake fluid, the change over valve 3 is changed over to the closed state. The first to third judging methods will be explained hereinafter.

(First Judging Method)

According to the first judging method, when the difference between the actual accumulator pressure Par of the accumulator 41 and the actual assisting pressure Psr actually generated by the boosting device 4 is equal to or smaller than a first predetermine value, the assisting pressure limit judging portion 61 judges that the assisting pressure Ps has reached the assisting limit pressure. The actual accumulator pressure Par corresponds to the detected value of the pressure sensor 75 and the actual assisting pressure Psr corresponds to the detected value of the pressure sensor 74. It is preferable to set the first predetermined value to be zero, but not limited thereto and may be any value as long as such value can achieve the purpose of the invention. According to this method, the first predetermined value can be set so that the value can judge that the actual assisting pressure Psr is the assisting limit pressure value. This first predetermined value can be calculated in advance by calculation simulation or an experimental work or the like.

According to this judging method, the first predetermined value can be set to the pressure variation value corresponding to the pulsation of the actual accumulator pressure Par. During the actual accumulator pressure Par being pulsating, when the lower pressure value of the pulsation becomes equal to the actual assisting pressure Psr, such value of actual assisting pressure Psr becomes the assisting limit pressure value. Accordingly, by setting the first predetermined value to be the value corresponding to the magnitude of the pulsation of the actual accumulator pressure Par, the judgment taking into consideration of pressure pulsation of the accumulator 41 can be made. Thus, even the actual accumulator pressure Par pulsates, accurate judgment can be made.

According to this judging method, since the assisting pressure limit judgment is made based on the actual accumulator pressure Par and the actually generated actual assisting pressure Psr, the reaction force pressure Pr can be relieved when the assisting pressure Ps actually reaches the assisting limit pressure value. Thus, the boosting device 4 can generate the assisting pressure Ps using the accumulated pressure energy to a maximum extent.

FIG. 7 (A) shows the time change of the actual assisting pressure Psr with the curved line W71 and the time change of the actual accumulator pressure Par with the curved line W72. As the value of the actual assisting pressure Psr increases, the value of the actual accumulator pressure Par decreases. At the time point t1, the values of the actual accumulator pressure Par and the actual assisting pressure Psr become equal, that is, the actual assisting pressure Psr becomes the actual accumulator pressure Par. The assisting pressure limit judging portion 61 calculates the difference between the actual accumulator pressure Par and the actual assisting pressure Psr and at this time judges, that the assisting pressure Ps reaches the assisting limit pressure since the pressure difference is zero which corresponds to the first predetermined value 0.

(Second Judging Method)

According to the second judging method, when the difference between the actual accumulator pressure Par and the target assisting pressure Pstg is smaller than a second predetermine value, the assisting pressure limit judging portion 61 judges that the assisting pressure Ps has reached the assisting limit pressure. The actual accumulator pressure Par corresponds to the detected value of the pressure sensor 75 and the target assisting pressure Pstg is the value calculated by the target assisting pressure calculating portion 63 and is calculated in response to the brake operation amount S of the brake pedal. This value corresponds to the command value of the assisting pressure Ps. It is preferable to set this second predetermined value to be zero, but not limited thereto and may be any value as long as such value can achieve the purpose of the invention. According to this method, the second predetermined value can be set so that the value can judge that the target assisting pressure Pstg is the assisting pressure limit value. This second predetermined value can be calculated in advance by calculation simulation or an experimental work or the like.

The assisting pressure Ps can be formed by adjusting the hydraulic pressure accumulated in the accumulator 41 at the linear valve 44 for pressure increase and the linear valve 45 for pressure decrease. Accordingly, a time lag may arise from the time of setting the target assisting pressure value Pstg upon brake pedal 115 depression operation by the operator of the vehicle to the time when the actual assisting pressure Psr reaches the set target assisting pressure Pstg. For example, in case of emergency braking request or ABS controlling, a great braking force becomes necessary and accordingly, if the judgment is made according to the values of the actual accumulator pressure Par and the actual assisting pressure Psr, even if it is judged not to be the pressure limit situation, the assisting pressure limit comes immediately thereafter due to the sudden increase of the actual assisting pressure Psr. However, according to this method, since the judgment is made according to the values of the actual accumulator pressure Par and the target assisting pressure Pstg, the assisting pressure limit can be judged taking into consideration of the predicted increase/decrease of the assisting pressure Ps.

FIG. 7 (B) shows the time change of the actual assisting pressure Psr with the curved line W73 and the time change of the target assisting pressure Pstg with the curved line W74. Further, the time change of the actual accumulator pressure Par is indicated as the curved line W75. The value of the actual assisting pressure Psr (line W73) increases in a delayed fashion from the target assisting pressure Pstg (line W74). The actual accumulator pressure Par (line W75) decreases as the actual assisting pressure Psr (line W73) increases. At the time point t2, the difference between the actual accumulator pressure Par and the target assisting pressure Pstg become zero which corresponds to the second predetermined value 0. Accordingly, the assisting pressure Ps at this point is judged by the assisting pressure limit judging portion 61 to be the assisting limit pressure. FIG. 7 (B) further shows the time change of the actual assisting pressure Psr after the time t2 with the dotted curved line W73a and the time change of the target assisting pressure Pstg after the time t2 with the dotted curved line W74a. Further, the time change of the actual accumulator pressure Par after the time t2 is indicated as the dotted curved line W75a. After the time t2, the actual assisting pressure Psr (line W73a) increases as the target assisting pressure Pstg (line W74) increases. Soon after the values of the actual assisting pressure Psr and the actual accumulator pressure Par become equal to exhibit the assisting limit pressure Psm. At the time t2, the increase of the actual assisting pressure Psr can be predicted from the target assisting pressure Pstg and accordingly, when the assisting pressure limit is judged based on the actual accumulator pressure Par and the target assisting pressure Pstg, the actual assisting pressure Psr can be predicted to reach the assisting limit pressure. Therefore, the assisting pressure limit judging portion 61 judges that the assisting pressure Ps has reached the assisting limit pressure at the time t2.

(Third Judging Method)

According to the third judging method, when the difference between the estimated accumulator pressure Paes and the target assisting pressure Pstg is smaller than a third predetermine value, the assisting limit pressure judging portion 61 judges that the assisting pressure Ps has reached the assisting limit pressure. The target assisting pressure Pstg is the value calculated by the target assisting pressure calculating portion 63 and is calculated in response to the brake operation amount S of the brake pedal 115. The estimated accumulator pressure Paes is the value calculated by the estimated accumulator pressure calculating portion 64 and is calculated in accordance with the values of the actual accumulator pressure Par and the target assisting pressure Pstg. The estimated value Paes is the estimated value (predicted value) of the accumulator pressure Pa. It is preferable to set this third predetermined value to be zero, but not limited thereto and may be any value as long as such value can achieve the purpose of the invention. According to this method, the third predetermined value can be set so that the value can judge that the target assisting pressure Pstg is the assisting limit pressure value. This third predetermined value can be calculated in advance by calculation simulation or an experimental work or the like.

FIG. 7 (C) shows the time change of the target assisting pressure Pstg with the line W76 and the time change of the actual accumulator pressure Par with the two lines W77 and W78. The line W77 indicates that the value of the actual accumulator pressure Par is P72 at the time point t3. The line W78 indicates that the value of the actual accumulator pressure Par is P73 at the time point t3. The values of the target assisting pressure Pstg and the actual accumulator pressure Par are constant until time t3. At the time t3, the target assisting pressure Pstg suddenly increases to exhibit the value Ps1. This may be exampled as for the cases of sudden braking operation and braking under ABS operation as explained in the second judging method. The value Ps1 is defined to be the assisting limit pressure value Psm. After the time t3, the target assisting pressure Pstg is indicated with the dotted line W76a and the actual accumulator pressure Par is indicated with the dotted lines W77a and 78a. The time change of estimated accumulator pressure Paes is indicated with the dotted line W77es(Pa52) when the actual accumulator pressure Par is P72 at the time t3. The time change of estimated accumulator pressure Paes is indicated with the dotted line W78es(Pa51) when the actual accumulator pressure Par is P73 at the time t3.

First, it is explained where the actual accumulator pressure Par is the value P72 at the time t3, the estimated accumulator pressure calculating portion 64 outputs the value Pa52 as the estimated accumulator pressure Paes when the target assisting pressure Pstg is at the value Ps1. The assisting pressure judging portion 61 calculates the difference d between the values of Pa 52 and Ps1. Since the difference d is smaller than the third predetermined value 0, the assisting pressure judging portion 61 judges that the assisting pressure Ps is the assisting limit pressure value. On the other hand, at the time t3, when the actual accumulator pressure Par exhibits the value P73, the estimated accumulator pressure calculating portion 64 outputs the value Pa51 as the estimated accumulator pressure Paes when the target assisting pressure Pstg is at the value Ps1. The assisting pressure limit judging portion 61 calculates the difference e between the values of Pa51 and Ps1. Since the difference e is larger than zero, the assisting pressure judging portion 61 does not judge that the assisting pressure Ps reaches the assisting limit pressure value.

According to this judging method, at the time t3 before the actual accumulator pressure Par and the actual assisting pressure Psr are not initiating pressure increase or decrease change, the assisting pressure limit judgment is made based on the estimated accumulator pressure Paes and the target assisting pressure Pstg.

(Fourth Judging Method)

Next, the fourth judging method will be explained hereinafter. The fourth judging method has basically the same procedure of the first judging method explained above. The same processes to the processes in the first judging method are referenced as the same numerals or legends and detail explanation will be omitted from this section and mainly the different portions and points will be mainly explained. FIG. 8 shows an example of flowchart according to the fourth judging method. One difference of this method from the first judging method is that the judgment of the step S12a will be executed when the condition of the step S12 is satisfied.

In the step S12, when the assisting pressure Ps is judged to be the assisting limit pressure, the assisting pressure limit judging portion 61 judges whether or not the target assisting pressure Pstg is smaller than the estimated accumulator pressure Paes (step S12a). When the target assisting pressure Pstg is less than the estimated accumulator pressure Paes, the change over controlling portion 62 keeps the valve 3 to the closed state (step S14). On the other hand, when the target assisting pressure Pstg is equal to or larger than the estimated accumulator pressure Paes, the change over controlling portion 62 changes the change over valve 3 over to the open state (step S13). The target assisting pressure Pstg and the estimated accumulator pressure Paes are the same to those explained in the third judging method.

According to this method, as similar to the first method, when the difference between the actual accumulator pressure Par of the accumulator 41 and the actual assisting pressure actually generated by the boosting device 4 is less than the first predetermined value, the assisting pressure Ps is judged to be the assisting limit pressure. And when the assisting pressure Ps is judged to be the assisting limit pressure and yet if the target assisting pressure Pstg is smaller than the estimated accumulator pressure Paes, the change over controlling portion 62 keeps the valve 3 to the closed state. For example, when the operation amount S of the brake pedal 115 or the depression force F operated by the operator of the vehicle becomes small, a decrease of actual assisting pressure Psr is expected. Further, if the pump driving motor 43 of the accumulator 41 is driven and pressure energy is supplemented to the accumulator 41, an increase of the actual accumulator pressure Par is expected. Accordingly, even if the assisting pressure Ps is judged to be the assisting limit pressure, based on the actual accumulator pressure Par and the actual assisting pressure Psr; the change over controlling portion 62 keeps the change over valve 3 to be in the closed state when the value of the target assisting pressure Pstg is smaller than the value of the estimated accumulator pressure Paes. If a resolving of assisting limit pressure of the assisting pressure Ps is highly expected, by keeping the change over valve 3 to be in the closed state, the reaction force generating device 2 can continues to generate a reaction force pressure Pr in response to the brake operation amount S by the operator of the vehicle in the reaction force chamber 128.

(2) Second Embodiment

The vehicle brake system according to the second embodiment exhibits basically the same structure, function and effects to the vehicle brake system according to the first embodiment. The components and systems common to those of the first embodiment will be omitted from the detail explanation by numbering the same reference numerals to the same components and systems. According to this second embodiment, the reaction force generating device 2 and the brake boosting device 4 are different in structure compared to the devices of the first embodiment. FIG. 9 is the schematic diagram showing the structures of the reaction force generating device and the brake boosting device associated with the second embodiment.

The port 133 of the assisting pressure chamber 127 is hydraulically connected to the inlet/outlet port of the accumulator (Acc) 40 via the conduits 45a, 45b and 45c, interposing therebetween an assisting pressure chamber inflow modulating valve V1 of linear type for modulating the flow rate into the assisting pressure chamber and a one-way valve Vb for restraining the flow into the accumulator 40 and at the same time the port 133 is hydraulically connected to the reservoir 32 via the conduits 45a, 45d and 45e, interposing therebetween an assisting pressure chamber outflow modulating valve V2 of linear type.

The inlet/outlet port of the accumulator 40 is also connected to an ejection port of a hydraulic pressure pump 39 via a conduit 45f branched from the conduit 45c and a one-way valve Va is interposed in the conduit 45f between the accumulator and the pump 39. A conduit 45h is branched from the conduit 45c and is connected to one of the port of a reaction force chamber inflow modulating valve V3 of linear type. The one-way valve Va allows the fluid flow from the hydraulic pressure pump 39 to the accumulator 40, but prohibits the pressurized fluid flow from the accumulator 40 to the hydraulic pressure pump 39.

The hydraulic pressure pump 39 is connected to a pump driving motor 41 and further the inlet/outlet port of the hydraulic pressure pump 39 is connected to the reservoir 32 via a one-way valve Vc with the conduit 45g. The one-way valve Vc allows the fluid flow from the reservoir 32 to the inlet/outlet port of the pump 39 but prohibits the fluid flow from the pump 39 to the reservoir 32.

The other side port of the reaction force chamber inflow modulating valve V3 is connected to the port 129 of the reaction force chamber 128 via the conduits 45i and 130. Accordingly, the port 129 of the reaction force chamber 128 is connected to the hydraulic pressure pump 39 via the conduits 130 and 45i, reaction force chamber inflow modulating valve V3, conduits 45h, 45c and 45f and the one-way valve Va. Further, the port 129 is connected to the reservoir 32 via the reaction force chamber outflow modulating valve V4 of linear type with the conduits 130 and 45e. It is noted here that the assisting pressure chamber inflow modulating valve V1 of linear type, the assisting pressure chamber outflow modulating valve V2 of linear type, the reaction force chamber inflow modulating valve V3 of linear type and the reaction force chamber outflow modulating valve V4 of linear type are referred to simply as linear valves V1, V2, V3 and V4.

A midway of the conduit 45i which connects the linear valve V3 with the linear valve V4 and a midway of the conduit 45e connected to the reservoir 32 are connected with a conduit 45k in which a relief valve Vd is interposed. The midway of the conduit 45e and the midway of the conduit 45c which connects the accumulator 40 with the linear valve V1 are connected with a conduit 45m in which a relief valve Ve is interposed. These relief valves Vd and Ve are provided for relieving the pressure to the reservoir 32 when pressures in the reaction force chamber 128 and the accumulator 40 receive pressures equal to or more than predetermined pressure values to prevent any possible damage to the reaction force chamber 128 and the accumulator 40 due to receiving an excess pressure.

A pressure sensor P1 is provided in the conduit 45c which is connected to the inlet/outlet port of the accumulator 40. The pressure sensor P1 is used for detecting the pressure energy (actual accumulator pressure Par) accumulated in the accumulator 40. Another pressure sensor P2 is provided in the conduit 45a which is connected to the port 133 of the assisting pressure chamber 127. The pressure sensor P2 is used for detecting the hydraulic pressure in the assisting pressure chamber 127. A further pressure sensor P3 is provided in the conduit 130 which is connected to the port 129 of the reaction force chamber 128. The pressure sensor P3 is used for detecting the hydraulic pressure in the reaction force chamber 128.

The accumulator 40 is provided for accumulating hydraulic pressure generated by the hydraulic pressure pump 39. Thus accumulated pressure is supplied to the assisting pressure chamber 127 via the assisting pressure chamber inflow modulating valve (linear valve V1) thereby to obtain the hydraulic pressure braking force Fb. When the pressure sensor P1 detects that the actual accumulator pressure Par becomes lower than a predetermined pressure level, the brake ECU 6 outputs a control signal to drive the motor 41. The hydraulic pressure pump 39 is then driven by the motor 41 to supply the accumulator 40 with brake fluid for supplementing the pressure energy accumulated in the accumulator 40. The accumulator 40 is also used for dampening the pulsation of the brake fluid ejected from the hydraulic pressure pump 39.

The linear valves V1 through V4 are the flow rate modulating type electromagnetic valves and throttle resistance magnitude of each valve V1 through V4 is controlled in response to a control signal from the brake ECU 6 to modulate the hydraulic pressure in the assisting pressure chamber 127 and the reaction force chamber 128. When the assisting pressure limit judging portion 61 judges that the assisting pressure Ps has reached the assisting limit pressure value, the change over controlling portion 62 changes the change over valve 3 over to open state. It is preferable during this operation to close the linear valves V3 and V4 by maximizing the throttle resistance of each valve V3 and V4.

It is noted that when the assisting pressure limit judging portion 61 judges that the assisting pressure has reached the assisting limit pressure value, the brake ECU 6 controls to minimize the throttle resistance of the linear valves V4 to thereby keeping the valves to be in open state. This controlling operation can obtain the same effects to the change over operation of the change over valve 3. In this case, the provision of a change over valve 3 can be omitted.

According to the embodiment of the invention, when the assisting pressure limit judging portion 61 judges that the predetermined condition that the assisting pressure Ps has reached the assisting limit pressure value has been established, the change over controlling portion 62 changes the change over valve 3 over to the open state. Accordingly, the reaction force based on the reaction force pressure Pr from the reaction force chamber 128 becomes zero. The operator of the vehicle receives less reaction force from pedal 115. Thus after the assisting pressure Ps exceeds the assisting limit pressure value, the pedal depression force F by the operator can be efficiently utilized as the braking force.

According to another aspect of the embodiment of the invention, the predetermined condition whether the assisting pressure limit judging portion 61 judges that the assisting pressure Ps has reached to the assisting limit pressure value has been established or not is that a difference between the actual accumulator pressure Par and the actual assisting pressure Psr actually generated by the brake force boosting device 4 is less than the first predetermined value, which is preferably set to be zero.

According to this aspect of the embodiment, since the assisting pressure limit judgment is made based on the actual accumulator pressure Par and the actual assisting pressure Psr, the reaction force pressure Pr can be relieved when the assisting pressure Ps actually reaches the assisting limit pressure. Accordingly, the brake boosting device 4 can generate the assisting pressure Ps maximizing the use of the pressure energy accumulated in the accumulator 40.

According to still another aspect of the embodiment of the invention, the vehicle brake system further comprises the target assisting pressure calculating portion 63 for calculating the target assisting pressure Pstg to be generated by the brake boosting device 4 in response to the depression force of the brake pedal 115 or the operation amount thereof, wherein the predetermined condition is that the difference between the actual accumulator pressure Par and the target assisting pressure Pstg is less than the second predetermined value which is preferably set to be zero.

According to this aspect of the embodiment of the invention, since the judgment of the assisting pressure limit is made based on the actual accumulator pressure Par and the target assisting pressure Pstg, the judgment can be made with the predicted increase or decrease of the assisting pressure.

According to further aspect of the embodiment of the invention, the vehicle brake system further includes the target assisting pressure calculating portion 63 for calculating the target assisting pressure Pstg to be generated by the brake boosting device 4 in response to the depression force of the brake pedal 115 or the operation amount S thereof and the estimated accumulator pressure calculating portion 64 for calculating the estimated accumulator pressure Paes which corresponds to the estimated pressure value accumulated in the accumulator 41, wherein the predetermined condition is that the difference between the estimated accumulator pressure Paes and the target assisting pressure Pstg is less than the third predetermined value.

In this aspect of the embodiment of the invention, since the judgment of the assisting pressure limit is made based on the estimated accumulator pressure Paes and the target assisting pressure Pstg, the judgment can be made with the predicted increase or decrease of the accumulator pressure Pa as well as the assisting pressure Ps.

According to still further aspect of the embodiment of the invention, the vehicle brake system still further includes the target assisting pressure calculating portion 63 for calculating the target assisting pressure Pstg to be generated by the brake boosting device 4 in response to the depression force of the brake pedal 115 or the operation amount S thereof and the estimated accumulator pressure calculating portion 64 for calculating the estimated accumulator pressure Paes which corresponds to the estimated pressure value accumulated in the accumulator 41, wherein when the target assisting pressure Pstg is smaller than the estimated accumulator pressure Paes value, the change over controlling portion 62 keeps the closed state of the change over valve 3.

In this aspect of the embodiment, even when the assisting pressure Ps is judged to be the assisting limit pressure based on the actual accumulator pressure Par and the actual assisting pressure Psr, if the target assisting pressure Pstg is smaller than the estimated accumulator pressure Paes, the change over controlling portion 62 keeps the change over valve 3 to the closed state. If the resolving of assisting pressure limit of the assisting pressure Ps is highly expected, by keeping the change over valve 3 to be in the closed state, the reaction force generating device 2 can continues to generate a reaction force pressure Pr in response to the brake operation amount S by the operator of the vehicle in the reaction force chamber 128.

According to further aspect of the embodiment of the invention, the change over controlling portion 62 keeps the open state of the change over valve 3 during one braking operation in which the brake pedal 115 is continued to be operated, even the assisting pressure limit judging portion 61 judges the non-establishment of the predetermined condition after the change over valve 3 has been changed over to the open state.

If the change over valve 3 repeats the change over operation from open to closed or closed to open state, the reaction force pressure Pr suddenly changes. Accordingly, the change over valve 3 is kept in the open state during the one braking operation if it is in the open state so as to prevent the sudden changes of the reaction force pressure Pr. This can eventually improve the braking operation maneuverability by preventing the sudden changes of the reaction force pressure Pr, which may lead to give an uncomfortable brake operation to the operator.

Obviously, numerous modifications and variations of the present invention are possible in light of the above teachings. It is therefore to be understood that within the scope of the appended claims, the present invention may be practiced otherwise than as specifically described herein.

What is claimed is:

1. A vehicle brake system comprising:
a master brake cylinder having an input piston inserted into an input cylinder bore and slidable therein in an axial line direction in response to operation of a brake pedal and a master piston inserted into a pressure cylinder bore and arranged with a predetermined distance apart from the input piston in an advancing direction thereof, the master piston being slidable in the pressure cylinder bore in the axial line direction, independently of the slidable movement of the input piston;
a reaction force generating device hydraulically connected to a reaction force chamber defined between a bottom portion of the input cylinder bore and a front end surface of the input piston and generating a reaction force pressure in the reaction force chamber corresponding to a displacement amount of the input piston;
a change over valve provided in an open passage which is branched from a hydraulic conduit hydraulically connecting the reaction force chamber and the reaction force generating device, the open passage being in hydraulic communication with a reservoir;
a brake force boosting device generating assisting pressure by controlling the brake fluid having an actual accumulator pressure discharged from an accumulator corresponding to depression force of the brake pedal or an operation amount of the brake pedal and supplying the assisting pressure to an assisting pressure chamber formed in the pressure cylinder bore by defining thereof with a rear side of the master piston, whereby a thrust force which is a boosted depression force of the brake pedal is exerted on the master piston;
a wheel brake device having a wheel brake cylinder in hydraulic communication with a hydraulic pressure chamber formed in the pressure cylinder bore defining thereof by a front side of the master piston, the hydraulic pressure chamber generating a basic hydraulic pressure in response to the advancing movement of the master piston;
an assisting pressure limit judging portion for judging whether a predetermined condition that the assisting pressure generated by the brake force boosting device has reached to an assisting limit pressure has been established or not; and a change over controlling portion for changing over the change over valve to an open state when the assisting pressure limit judging portion judges that the predetermined condition has been established.

2. The vehicle brake system according to claim 1, wherein the predetermined condition is that a difference between the actual accumulator pressure and an actual assisting pressure actually generated by the brake force boosting device is less than a first predetermined value.

3. The vehicle brake system according to claim 2, further comprising:
   a target assisting pressure calculating portion for calculating a target assisting pressure generated by the brake boosting device in response to the depression force of the brake pedal or the operation amount thereof; and
   an estimated accumulator pressure calculating portion for calculating an estimated accumulator pressure which corresponds to an estimated pressure value accumulated in the accumulator, wherein when the target assisting pressure is smaller than the estimated accumulator pressure value, the change over controlling portion keeps the closed state of the change over valve.

4. The vehicle brake system according to claim 3, wherein the change over controlling portion keeps the open state of the change over valve during one braking operation in which the brake pedal is continued to be operated, even the assisting pressure limit judging portion judges the non-establishment of the predetermined condition after the change over valve has been changed over to the open state.

5. The vehicle brake system according to claim 2, wherein the change over controlling portion keeps the open state of the change over valve during one braking operation in which the brake pedal is continued to be operated, even the assisting pressure limit judging portion judges the non-establishment of the predetermined condition after the change over valve has been changed over to the open state.

6. The vehicle brake system according to claim 1, further comprising
   a target assisting pressure calculating portion for calculating a target assisting pressure to be generated by the brake boosting device in response to the depression force of the brake pedal or the operation amount thereof, wherein the predetermined condition is that a difference between the actual accumulator pressure and the target assisting pressure is less than a second predetermined value.

7. The vehicle brake system according to claim 6, wherein the change over controlling portion keeps the open state of the change over valve during one braking operation in which the brake pedal is continued to be operated, even the assisting pressure limit judging portion judges the non-establishment of the predetermined condition after the change over valve has been changed over to the open state.

8. The vehicle brake system according to claim 1, further comprising:
   a target assisting pressure calculating portion for calculating a target assisting pressure generated by the brake boosting device in response to the depression force of the brake pedal or the operation amount thereof; and
   an estimated accumulator pressure calculating portion for calculating an estimated accumulator pressure which corresponds to an estimated pressure value accumulated in the accumulator, wherein the predetermined condition is that a difference between the estimated accumulator pressure and the target assisting pressure is less than a third predetermined value.

9. The vehicle brake system according to claim 8, wherein the change over controlling portion keeps the open state of the change over valve during one braking operation in which the brake pedal is continued to be operated, even the assisting pressure limit judging portion judges the non-establishment of the predetermined condition after the change over valve has been changed over to the open state.

10. The vehicle brake system according to claim 1, wherein the change over controlling portion keeps the open state of the change over valve during one braking operation in which the brake pedal is continued to be operated, even the assisting pressure limit judging portion judges the non-establishment of the predetermined condition after the change over valve has been changed over to the open state.

* * * * *